United States Patent
Haggerty et al.

(10) Patent No.: US 12,405,941 B2
(45) Date of Patent: Sep. 2, 2025

(54) MULTI-REGION WORKFLOW MANAGEMENT

(71) Applicant: Capital One Services, LLC, McLean, VA (US)

(72) Inventors: Timothy Haggerty, Henrico, VA (US); Venu Kumar Nannapaneni, Glen Allen, VA (US); Ramachandra Kancharla, Glen Allen, VA (US); Pravin Nair, Addison, TX (US); Priyank Chittaranjan Subhedar, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 128 days.

(21) Appl. No.: 18/317,689

(22) Filed: May 15, 2023

(65) Prior Publication Data

US 2024/0386008 A1    Nov. 21, 2024

(51) Int. Cl.
| | | |
|---|---|---|
| *G06F 16/00* | (2019.01) | |
| *G06F 16/23* | (2019.01) | |
| *G06F 16/25* | (2019.01) | |
| *G06F 16/27* | (2019.01) | |

(52) U.S. Cl.
CPC ........ *G06F 16/2365* (2019.01); *G06F 16/254* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 10,936,206 B1 * | 3/2021 | Dittia | G06F 3/0619 |
| 2004/0054583 A1 * | 3/2004 | Nye, III | G06Q 30/0268 |
| | | | 705/16 |
| 2013/0246376 A1 * | 9/2013 | Padmanabhan | G06F 16/254 |
| | | | 707/694 |
| 2014/0337071 A1 * | 11/2014 | Stiffler | G06F 3/04847 |
| | | | 705/7.13 |
| 2017/0006135 A1 * | 1/2017 | Siebel | H04L 69/40 |

OTHER PUBLICATIONS

Lu, "A Data Center Monitoring Method and System", Dec. 7, 2016, 8 pages. (Year: 2016).*

(Continued)

*Primary Examiner* — Bai D Vu
(74) *Attorney, Agent, or Firm* — Banner & Witcoff, Ltd.

(57) ABSTRACT

Techniques for performing parallel processing jobs across regionally-distributed servers may include executing a requested job in parallel across two or more regional cloud-based servers, the status of parallel jobs may be locally monitored using respective local instances of a status-tracking database. The multiple instances may replicate modifications of one instance of the status database to other instances of the status database to synchronize the status of regional jobs. Replicating modifications across the respective regional instances of the status database facilitates the parallel executing of the jobs across regions while reducing or avoiding unrecoverable delays if the tasks/job hangs or otherwise fails.

20 Claims, 5 Drawing Sheets

(56) References Cited

OTHER PUBLICATIONS

Joshi, et al., "Queues with Redundancy: Latency-Cost Analysis", https://www.rle.mit.edu/sia/wp-content/uploads/2015/07/2015-joshi-soljanin-wornell-mama.pdf, 3 pgs. ACM SIGMETRICS Performance Evaluation Review, vol. 43, Issue 216, pp. 54-56, Sep. 2015.
Gardner, et al. "Reducing Latency via Redundant Requests: Exact Analysis" https://kgardner.people.amherst.edu/papers/gardner_sigmetrics15.pdf, 14 pgs., Jun. 15-19, 2015.
Elliot et al. "Combining Partial Redundancy and Checkpointing for HPC", https://arcb.csc.ncsu.edu/~mueller/ftp/pub/mueller/papers/icdcs12.pdf, 12 pgs, 2012.
"What is Azure Batch?", https://learn.microsoft.com/en-us/azure/batch/batch-technical-overview, 5 pgs; Dec. 13, 2021.

* cited by examiner

MULTI-REGION WORKFLOW MANAGEMENT

FIELD OF USE

Aspects of the disclosure relate generally to processing of information using multi-region cloud-based services.

BACKGROUND

Conventional relational database management systems (RDBMS) are limited to single-region deployments, and would require extensive reconfigurations for multi-regional configurations to provide multi-regional multi-master datastores. In particular, such conventional systems would require adaption to allow non-sequential Globally Unique Identifiers (GUIDs) as well as reconfigurations of the database referential integrity.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein generally improve how companies use cloud-based services. In additional aspects, based on the improvements in how companies use cloud-based services, the companies' customers may also experience benefits in reduced computing delays. Possible use-cases may include lengthy computing tasks that typically result in unrecoverable delays if the tasks/jobs hang or otherwise fail.

One or more aspects are directed to improving the handling of cloud-based processing requests by executing (e.g. running) a requested job in parallel across two or more regional cloud-based servers, while locally monitoring the status of the parallel jobs using respective local instances of a status database. The multiple instances may be configured to replicate modifications of one instance of the status database to other instances of the status database to synchronize the status of regional jobs. By replicating modifications across the respective regional instances of the status database, the method and techniques of the disclosure facilitate the parallel execution of the particular job/tasks across two or more regions without requiring reporting to an external data store that may be subject to communication and uptime interruptions.

Other aspects may include monitoring the parallel jobs to determine if one or more of the regional jobs is to be terminated or permitted to complete. The determination may be made based on the synchronized status of regional jobs of the status database. By providing job redundancy across multiple regions by implementing jobs executed in-parallel across regions while identifying the statuses of the respect regional jobs, unrecoverable delays can be advantageously avoided or reduced while also improving the efficiency of the redundant jobs using the synchronized instances of the status database. Thus, significant processing delays may be avoided and reduce delays encountered by the companies' customers.

A system of one or more computers may be configured to perform particular operations or actions by virtue of having software, firmware, hardware, or a combination of them installed on the system that in operation causes or cause the system to perform the actions. One or more computer programs may be configured to perform particular operations or actions by virtue of including instructions that, when executed by data processing apparatus, cause the apparatus to perform the actions. As such, corresponding apparatus, systems, and computer-readable media are also within the scope of the disclosure.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for improving the handling of cloud-based processing requests by executing a requested job in parallel across two or more regional cloud-based servers, while locally monitoring the status of the parallel jobs using respective local instances of a status database. The multiple instances may be configured to replicate modifications of one instance of the status database to other instances of the status database to synchronize the status of regional jobs. By replicating modifications across the respective regional instances of the status database, the method and techniques of the disclosure facilitate the parallel execution of the particular job/tasks across two or more regions without requiring reporting to an external data store that may be subject to communication and uptime interruptions.

Other aspects may include monitoring the parallel jobs to determine if one or more of the regional jobs is to be terminated or permitted to complete. The determination may be made based on the synchronize the status of regional jobs of the status database. By providing job redundancy across multiple regions by implementing jobs executing in-parallel across regions while identifying the statuses of the respect regional jobs, unrecoverable delays can be advantageously avoided or reduced while also improving the efficiency of the redundant jobs using the synchronized instances of the status database. Thus, significant processing delays may be avoided and reduce delays encountered by the companies' customers.

Figure 1:
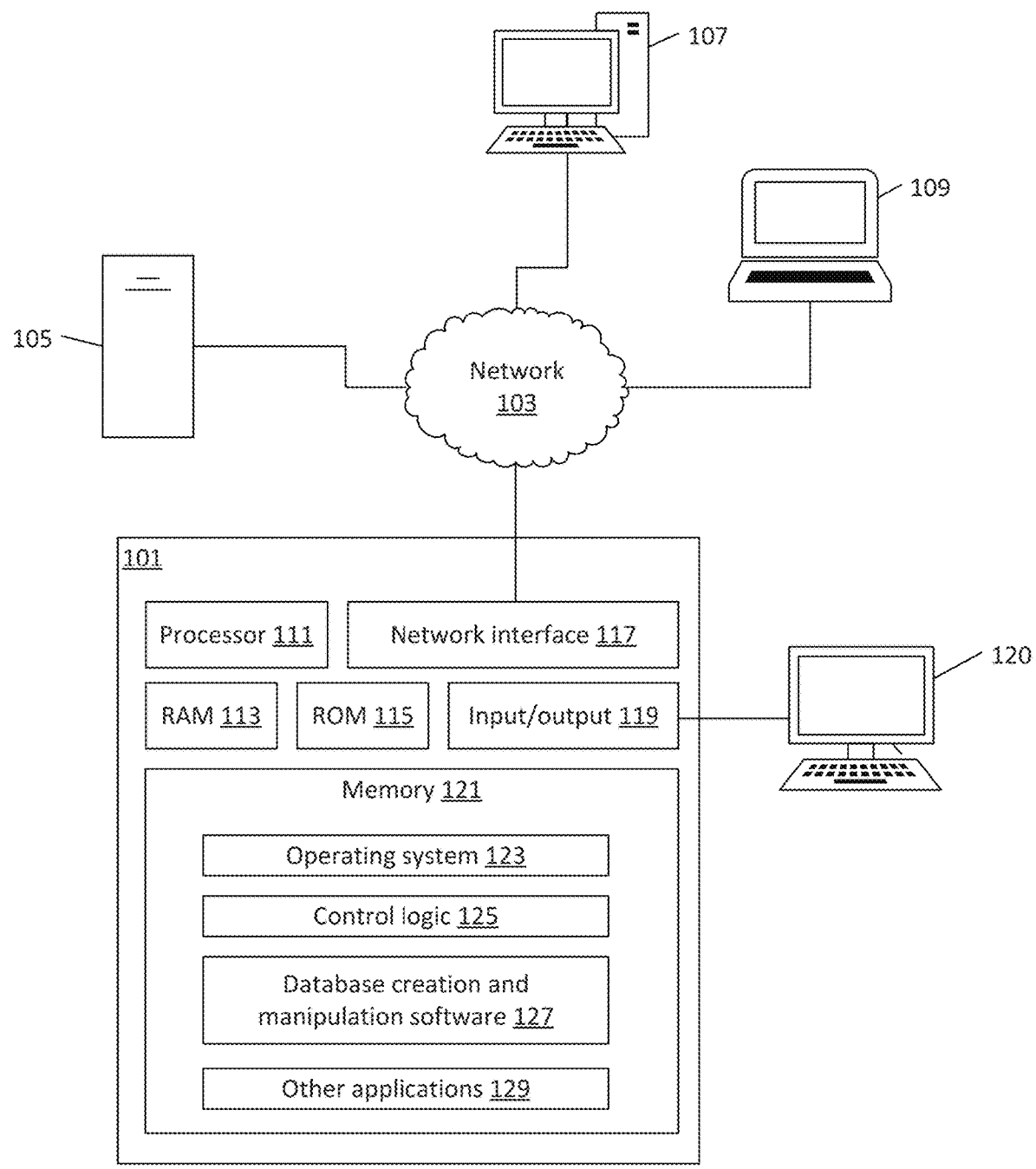
FIG. 1 shows an example computing device in accordance with one or more aspects described herein.

Before discussing the concepts of the disclosure in greater detail, however, several examples of a computing device that may be used in implementing and/or otherwise providing various aspects of the disclosure will first be discussed with respect to FIG. 1. FIG. 1 illustrates one example of a computing device 101 that may be used to implement one or more illustrative aspects discussed herein. For example, the computing device 101 may, in some embodiments, implement one or more aspects of the disclosure by reading and/or executing instructions and performing one or more actions based on the instructions. In some embodiments, the computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device. In an exemplary embodiment, the computing device 101 may be embodied as the computing device 203, server 201, server 202, and/or server 210 as discussed below with reference to FIG. 2.

The computing device 101 may, in some embodiments, operate in a standalone environment. In others, the computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media. Additionally, or alternatively, the computing device 101 and/or the network nodes 105, 107, and 109 may be a server hosting one or more databases. Databases may include, but are not limited to relational databases, non-relational databases, hierarchical databases, distributed databases, in-memory databases, flat file databases, XML databases, NoSQL databases, graph databases, and/or a combination thereof.

As seen in FIG. 1, the computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with database operations. Input/output 119 may include a variety of interface units and drives for reading, writing, displaying, and/or printing data or files. Input/output 119 may be coupled with a display such as display 120. Memory 121 may store software for configuring computing device 101 into a special purpose computing device in order to perform one or more of the various functions discussed herein. Memory 121 may store operating system software 123 for controlling overall operation of the computing device 101, control logic 125 for instructing the computing device 101 to perform aspects discussed herein, database creation and manipulation software 127 and other applications 129. Control logic 125 may be incorporated in and may be a part of database creation and manipulation software 127. In other embodiments, the computing device 101 may include two or more of any and/or all of these components (e.g., two or more processors, two or more memories, etc.) and/or other components and/or subsystems not illustrated here.

Devices 105, 107, 109 may have similar or different architecture as described with respect to the computing device 101. Those of skill in the art will appreciate that the functionality of the computing device 101 (or device 105, 107, 109) as described herein may be spread across multiple data processing devices, for example, to distribute processing load across multiple computers, to segregate transactions based on geographic location, user access level, quality of service (QOS), etc. For example, devices 101, 105, 107, 109, and others may operate in concert to provide parallel computing features in support of the operation of control logic 125 and/or software 127.

The data transferred to and from various computing devices may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the system 100 in front of one or more computing devices such that any external devices may communicate directly with the specialized hardware.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python, JavaScript, or an equivalent thereof. The computer executable instructions may be stored on a computer readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product. Having discussed several examples of computing devices which may be used to implement some aspects as discussed further below, discussion will now turn to a method for classifying textual data using a machine-learning classifier.

Figure 2:
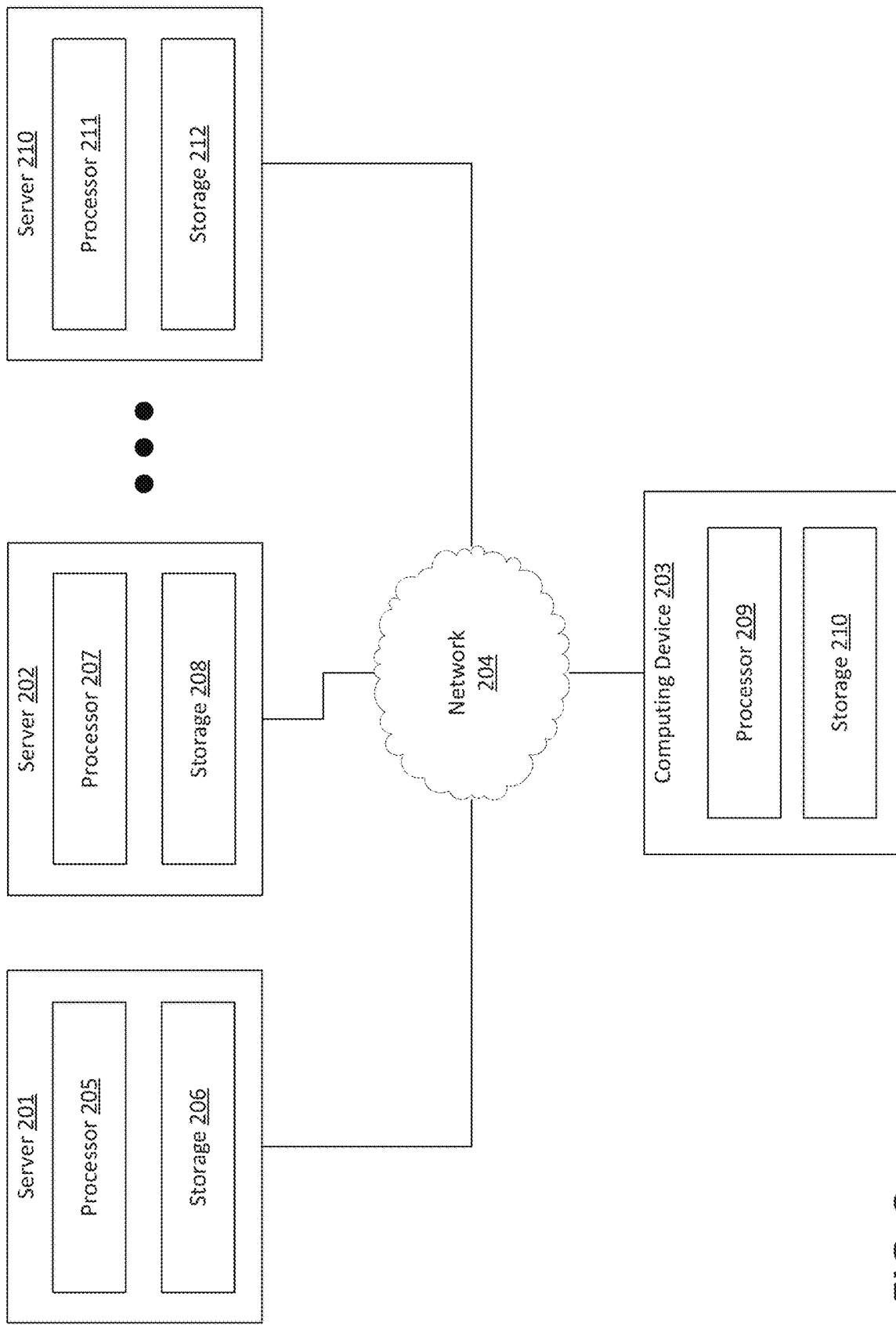
FIG. 2 shows an example computing environment in which one or more aspects described herein may be implemented.

FIG. 2 is a block diagram of an environment in which systems and/or methods described herein may be implemented. As shown in FIG. 2, the environment may include servers 201, 202, and 210, and a computing device 203 connected by a network 204. The devices, servers, and network may be interconnected via wired connections, wireless connections, or a combination of wired and wireless connections. The server 201, server 202, and server 210 may be located in different locations, such as in different regions. The servers 201 and 202 may be configured to parallelly perform one or more jobs or tasks to provide redundant processing of data as discussed herein. Although three servers and one computing device are illustrated, the disclosure is not limited thereto, and the environment may include more or fewer servers and/or devices. In an example, server 210 may be configured to perform job assignments (e.g., job assignments 304 in FIG. 3) to servers 201 and 202, and/or function as an external data store (e.g., data store 305 in FIG. 3).

The network 204 may include one or more wired and/or wireless networks. For example, network 204 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more servers shown in FIG. 2 may be implemented within a single server, or a single server shown in FIG. 2 may be implemented as multiple, distributed servers or in a cloud-based computing environment. For example, a single server may be implemented as multiple servers distributed among several regions. A set of devices of the environment may perform one or more functions described as being performed by another set of devices of the environment. Network 204 may be represented as a single network but may comprise combinations of other networks or subnetworks.

Storage 208 of server 202 may include a cluster with one or more compute instances. Each compute instance may include one or more tasks. Each task may be performed by a container. Other relationships between compute instances, tasks, and container may be used.

The server 210 may store data in storage 212 to be processed by job applications executed (e.g. performed) by servers 201 and/or 202. The data may be processed in parallel by processor 205 of server 201 and/or processor 207 of server 202. Additionally, or alternatively, the computing device 203 may store, in storage 210, data to be processed by job applications. The data from device 203 may be processed in parallel by processor 205 of server 201 and/or processor 207 of server 202. In this example, the storage 210 may also function as a data store, and the data store may be distributed to have a local instance (e.g. 312, 313 in FIG. 3) in one or more of the servers 201, 202.

Regionally-Distributed Parallel Processing Jobs

Figure 3:
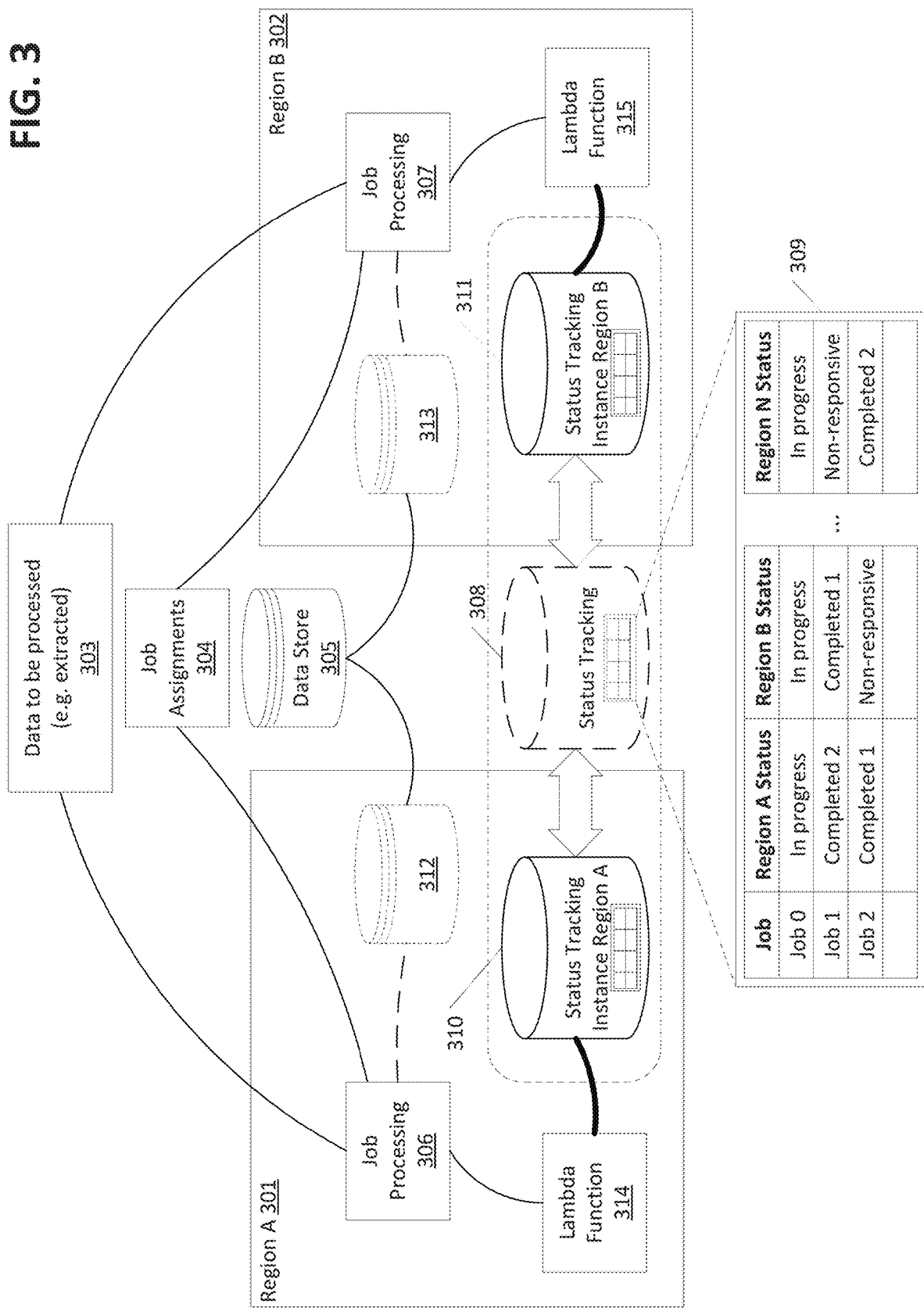
FIG. 3 shows an example computing environment in which one or more aspects described herein may be implemented.

FIG. 3 depicts an environment in which a processing job may be parallelly executed across regionally distributed servers. FIG. 3 includes a first region 301 (Region A) and a second region 302 (Region B). In an exemplary embodiment, first region 301 and second region 302 may be implemented by server 201 and server 202, respectively. Alternatively, server 201 or 202 may be implemented as multiple, distributed servers or cloud-based computing environments, where the regions 301 and 302 are implemented by respective distributed servers/computed environments.

The regions 301 and 302 may receive data 303 to be processed (e.g. extracted) and one or more job assignments 304. The data 303 and job assignment(s) 304 may be provided by, for example, computing device 203 or another server. In this example, the data 303 and job assignment(s) 304 may be stored in storage 210 and retrieved by processor 209 so as to provide the data 303 and job assignment(s) 304 to the regions 301 and 302. The environment may also include a data store 305, which may be implemented by the storage 210 in this example. In an exemplary embodiment, the data store 305 may be comprised of multiple instances that are distributed as a local data store instance 312, 313 in the regions 301, 302, respectively. In this example, the data store instances 312, 313 may be synchronized across the regions 301, 302.

The first region 301 may include a job processing module 306 configured to execute a processing job on data 303 that is received or otherwise available to the first region 301. The job processing module 306 may be implemented by, for example, processor 205. Additionally, or alternatively, the data to be processed may be received from the data store 305 (regional instance 312). The processing job may be provided in the received job assignment 304. The processing job may include a process identification, one or more validation rules, and/or machine-readable instructions for executing a process on the data 303. The data 303 may be included in the processing job in one or more aspects, or be separately provided to the first region 301. Processed data resulting from the processing job may be stored in the data store 305 (regional instance 312 implemented by storage 206) and/or one or more other internal and/or external storage devices available to first region 301.

In an exemplary embodiment, the processing job may be an extract, transform, and load (ETL) process that includes an extraction of data, transformation of data, and/or loading of data, but is not limited thereto. For example, the ETL process can be used to extract data (e.g. from legacy systems), cleanse the data to improve data quality and establish consistency, and load data into a target database. In other aspects, the processing job is an extract, load, transform (ELT) process.

The extraction of data may include the copying or exporting of raw data from source locations to a staging area. The data sources may be structured or unstructured and may include, without limitation, Structured Query Language (SQL) or NoSQL servers, flat files, Email, customer relationship management (CRM) systems, enterprise resource planning (ERP) systems, web pages, etc.

During the transformation, the raw data undergoes data processing in the staging area. The data may be transformed and/or consolidated based on the use case. The transformation of the data may include (but is not limited to) filtering, de-duplicating, cleansing, validating, and/or authenticating the data. Additionally, or alternatively, the processing may include: performing calculations, translations, and/or summarizations based on the raw data (e.g. modifying row and/or column headers for consistency, converting units of measurement, editing text strings, etc.); data audits for quality and/or compliance checks; encrypting and/or protecting data; and/or formatting or otherwise modifying the data (e.g. into tables or joined tables) to match the schema of the target. The loading process may include moving the transformed data from the staging area into a target.

The first region 301 may also include a local instance 310 of a status-tracking database 308. The status-tracking database 308 may include one or more database models, such as relational databases, non-relational databases, hierarchical databases, distributed databases, in-memory databases, flat file databases, XML databases, NoSQL databases, graph databases, and/or a combination thereof.

In an exemplary embodiment, the status-tracking database 308 may be implemented as regional (local) instances that may be configured to synchronize with other regional instances. For example, first region 301 may include local instance 310 of a status-tracking database 308 while second region 302 includes local instance 311. The synchronization of the regional instances 310, 311 forms status-tracking database 308 as shown in FIG. 3. In this example, the status-tracking database 308 may be a "virtual" database that is a collective representation of each of the synchronized regional instances 310, 311.

By the synchronization of the regional instances 310, 311, modifications of one instance of the status-tracking database 308 is replicated to other instances of the status-tracking database 308 to provide the status of a regional job to other regions. With the synchronization of the regional instances 310, 311, the present disclosure advantageously provides that the job/tasks may be parallelly executed across the regionally distributed servers 301, 302 without requiring reporting to an external data store (e.g., data store 305), which may be subject to communication and uptime interruptions. Utilizing the status-tracking database 308, the present disclosure can leverage the parallel execution of the processing jobs to advantageously avoid unrecoverable delays in situations where computing tasks/jobs hang or otherwise fail.

The status-tracking database 308 is configured to store status tracking data 309. The status tracking data 309 may include regional job statuses for one or more regional processing jobs that are synchronized from respective status-tracking regional instances 310, 311. In the example illustrated in FIG. 3, the status of "Job 0" is "in progress" across all regions. "Job 1" was initially completed by second region 302, followed by first region 301. "Job 2" as initially completed by first region 301, while the processing job was not completed (or the status was not made available) by second region 302. In this example, by providing job redundancy across multiple regions 301 and 302, the unrecoverable delay that would have resulted from the failure of the processing job by second region 302 is advantageously avoided.

In an exemplary embodiment, the synchronized statuses of the regional jobs may be used to control the executing of processing jobs. Other aspects may include monitoring the parallel jobs to determine if one or more of the regional jobs is to be terminated or permitted to complete. The determination may be based on the synchronized statuses of regional jobs of the status database 308. For example, a determination can be made to terminate a processing job based on a status of the job being executed by another region as reflected by that other region's local instance of the status-tracking database 308. In this example, if one of the redundant processing jobs has completed, and the completed status is reflected in the status-tracking database 308, the other redundant processing jobs that are still executing may be terminated (or may be allowed to finish if desired). The processor of the respective server may be configured to control or otherwise instruct the other servers executing the redundant jobs to terminate their respective jobs. In an exemplary embodiment, the job processing module 306 may be configured to update the status tracking instance 310 with a completed status upon completion of the processing job. This completed status is then synchronized across the other regional instances. The corresponding job processing modules (e.g., job processing module 307) may then decide to terminate based on the completed status by the other regional server.

In an exemplary embodiment, the first region 301 may include Lambda function module 314 configured to perform one or more Lambda functions. The Lambda function module 314 may be implemented by, for example, processor 205.

Lambda functions may include functions that may be used by higher-order functions, such as those functions performed by job processing module 306. Lambda functions may be used by other Lambda functions and/or used by non-Lambda functions to perform complex processing operations in first region 301. For example, the Lambda function module 314 may be configured to monitor the processing of jobs and/or tasks performed by job processing module 306 and to write a corresponding status to the regional instances 310 of the status-tracking database 308 and/or otherwise update one or more statuses within the regional instances 310 of the status-tracking database 308. Additionally, or alternatively, the Lambda function module 314 may receive a status notification from the job processing module 306 that indicates the status (e.g., in progress, job completed, job failed, etc.) of the current processing job(s) being executed by job processing module 306, and may write the status to the regional instances 310 of the status-tracking database 308 and/or otherwise update one or more statuses within the regional instances 310 of the status-tracking database 308.

As explained above, the Lambda function module 314 may monitor the status of the processing job being executed by the job processing module 306. When the Lambda function module 314 determines that the processing job has completed, the Lambda function module 314 may update the regional instance 310 of the status-tracking database 308. The Lambda function module 315 of the second region 302 may monitor their respective regional instance 311 and detect the completed status by first region 301. The Lambda function module 315 may then notify the job processing module 307 of the completed job. The job processing module 307 may then decide to terminate the processing job, for example, based on job processing module 306 completing processing of the processing job. In one aspect, the Lambda function module 315 may be configured to control the job processing module 307 to terminate the processing job based on the monitored statuses of the regional instance 311.

In an exemplary embodiment, the Lambda function module 314 may additionally or alternatively be configured to instruct or request the regional instance 310 of the status-tracking database 308 to synchronize one or more statuses stored therein with one or more other regional instances (e.g., regional instance 311) of the status-tracking database 308. The Lambda function module 314 may additionally or alternatively be configured to perform one or more functions for processing the data 303 under the direction of job processing module 306 and/or to otherwise assist in the processing of the data 303 by job processing module 306.

Like first region 301, second region 302 may include a job processing module 307 and a regional instance 311 of the status-tracking database 308. Job processing module 307 may be configured to perform functions similar to job processing module 306, and discussion of the similar functions has been omitted for brevity.

Second region 302 may additionally include Lambda function module 315. Lambda function module 315 may be configured to perform one or more Lambda functions similar to the operation of Lambda function 312. Discussion of these similar operations has been omitted for brevity. As will be appreciated, Second region 302 may include additional components or omit one or more components found in First region 301.

Parallel Processing Operations for Regionally-Distributed Jobs

The parallel processing of data using regionally-distributed jobs will be described in further detail with reference to FIGS. 4 and 5.

Figure 4:
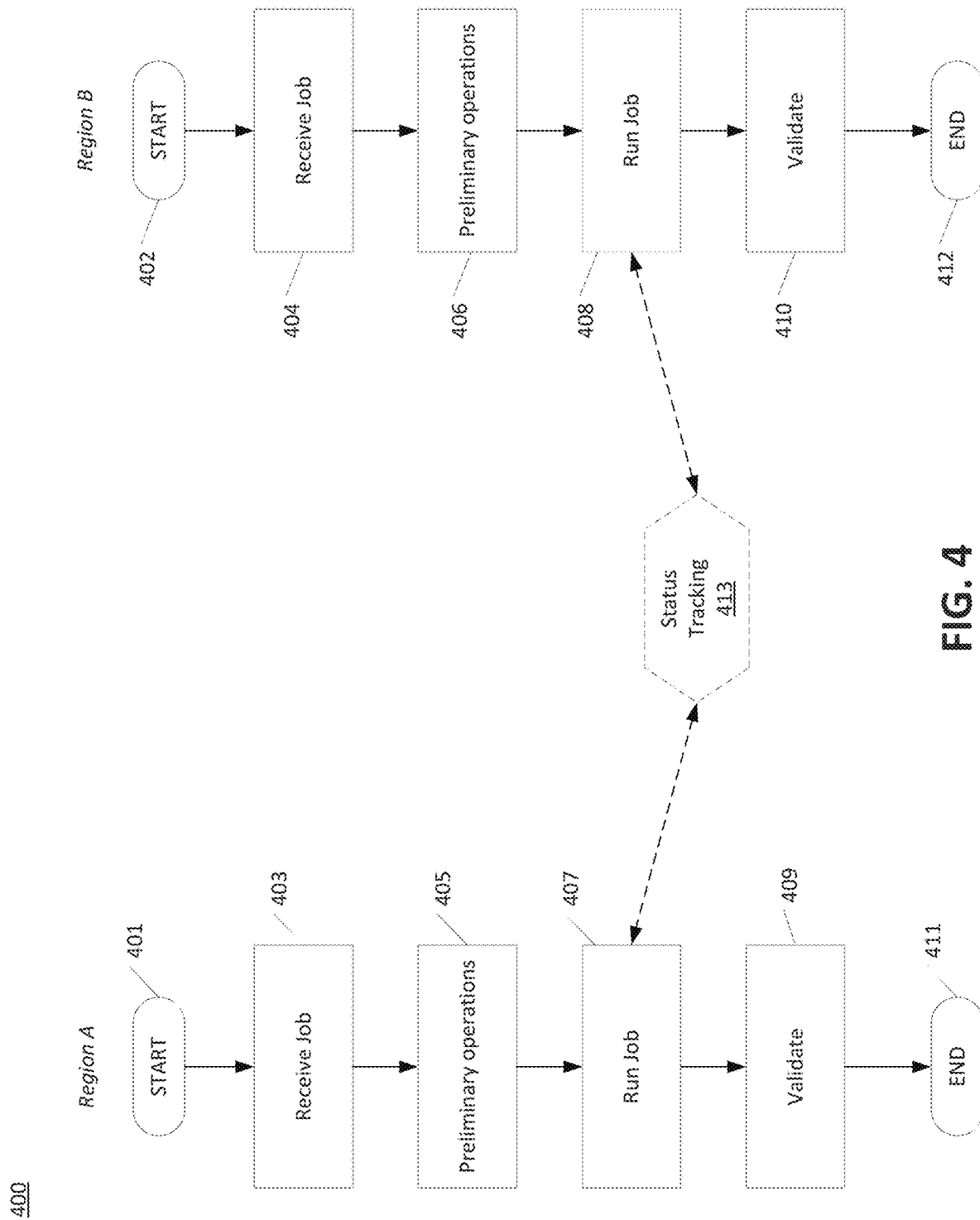
FIG. 4 shows a flowchart for a parallel processing of regionally-distributed jobs according to one or more aspects of the disclosure.
Figure 5:
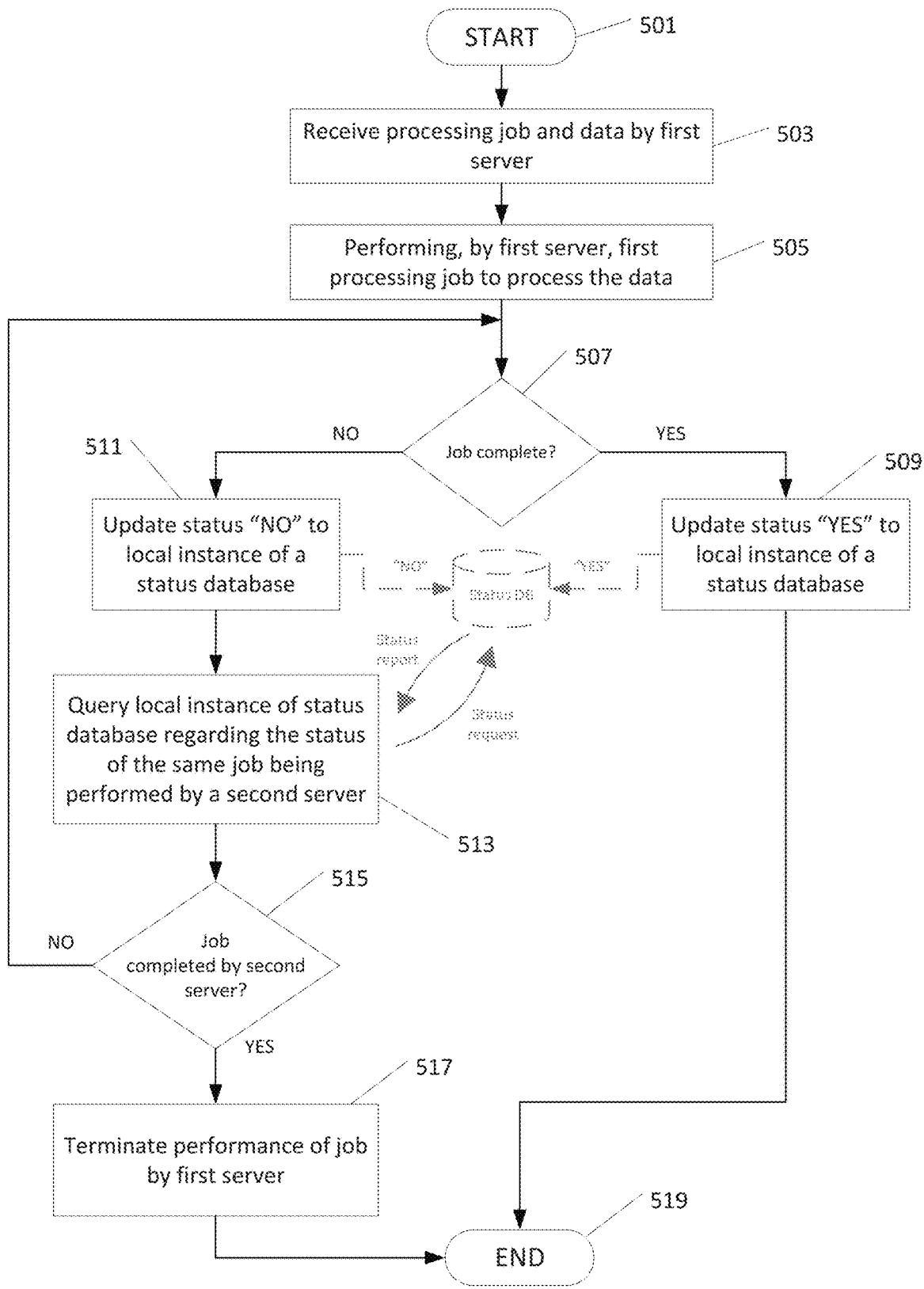
FIG. 5 shows a flowchart of a method for performing a processing job according to one or more aspects of the disclosure.

FIG. 4 is a flowchart for parallel processing of regionally-distributed jobs that may include the synchronization of regional instances of a status-tracking database 308. Some or all of the steps of process 400 may be performed using one or more computing devices as described herein, such as servers 201 and 202.

The parallel operations of process 400 begins at operations 401 and 402, and transitions to operations 403 and 404, respectively, where the processing job is received. The received processing job may include the data (e.g., data 303) to be processed, or the data (e.g., data 303) may be received separately. The received processing job may be provided in a job assignment, such as job assignment 304. The processing job may include a process identification, one or more validation rules, and/or machine-readable instructions for performing a process on the data. Operations 403 and 404 may be performed sequentially, at least partially concurrently, concurrently, or simultaneously.

At operations 405 and 406, preliminary operations are performed. The preliminary operations may include checking if dependencies have successfully completed and/or if dependent libraries are available. If the dependency check fails, the processing job can be retried and/or a notification of the failure can be generated. The preliminary operations may additionally or alternatively include setting up of the environment for the job. This may include building or reusing infrastructure. In an exemplary embodiment, the preliminary operations 405 and/or 406 may be performed before the processing job is received. Operations 405 and 406 may be performed sequentially, at least partially concurrently, concurrently, or simultaneously.

At operations 407 and 408, the processing job is executed (e.g., run). The parallelly execution of the jobs in different regions can provide redundant processing of data. In one or more aspects, the processing jobs may be an extract, transform, and load (ETL) process, but is not limited thereto.

Operations 407 and 408 across the regions are performed concurrently. The operations 407 and 408 may be performed at least partially concurrently. However, the greater amount of time that the operations 407 and 408 are being performed concurrently, the more process 400 may advantageously reduce and/or avoid potential delays if the jobs hang or otherwise fail. In an exemplary embodiment, the operations 407 and 408 are performed simultaneously.

During execution of the processing jobs across the regions, the status of the executing jobs may be monitored and used to update a status-tracking database 308 (operation 413). The status-tracking database 308 may be implemented as regional (local) instances within the respective regions. The regional instance (e.g. 310) may be configured to synchronize with other regional instances (e.g. 311 of second region 302). The synchronization of the regional instances 310, 311 forms status-tracking database 308 as shown in FIG. 3. By the synchronization of the regional instances 310, 311, modifications of one instance of the status-tracking database 308 is replicated to other instances of the status-tracking database 308 to provide the status of a regional job to other regions. With the synchronization of the regional instances 310, 311, the present disclosure advantageously provides that the job/tasks may be executed in-parallel across the regionally distributed servers 301, 302 without requiring reporting to an external data store (e.g. data store 305) that may be subject to communication and uptime interruptions. Further, the parallel execution advantageously avoids or reduces unrecoverable delays in situations where computing tasks/jobs hang or otherwise fail.

In an exemplary embodiment, for the status tracking at operation 413, the synchronized statuses of the regional jobs may be used to control the executing processing jobs. Other aspects may include monitoring the parallel jobs to determine if one or more of the regional jobs is to be terminated or permitted to complete. The determination may be based on the synchronized statuses of regional jobs for the status database 308. For example, a determination can be made to terminate a processing job based on a status of another processing job. In this example, if one of the redundant processing jobs has completed, and the completed status is reflected in the status-tracking database, the other redundant processing jobs that are still executing may be terminated. The processor of the respective server may be configured to control or otherwise instruct the other servers executing the redundant jobs to terminate their respective jobs.

In an exemplary embodiment, the job processing module 306 may be configured to update the status tracking instance 310 with a completed status upon completion of the processing job. This completed status is then synchronized across the other regional instances. The corresponding job processing modules may then decide to terminate based on the completed status by the other regional server. In one or more aspects, the Lambda function module 314 may monitor the status of the processing job being executed by the job processing module 306. When the Lambda function module 314 determines that the processing job has completed, the Lambda function module 314 may update the regional instance 310 of the status-tracking database 308. The Lambda function module 315 of the other region(s) may monitor their respective regional instance 311 of the second region 302 and detect the completed status by first region 301. The Lambda function module 315 may then notify the job processing module 307 that job processing module 306 has completed the job. The job processing module 307 may then decide to terminate the processing job. In one aspect, the Lambda function module 315 may be configured to control the job processing module 307 to terminate the processing job based on the monitored statuses of the regional instance 311.

At operations 409 and/or 410, the processed data may be validated. The processed data is generated by the completed processing job, and operation 409 and/or 410 may be skipped/omitted if the processing jobs executing in operations 407 and/or 408 are terminated, stalled, or otherwise fail. Operations 409 and 410 may be performed sequentially, at least partially concurrently, concurrently, or simultaneously. Operation 409 and/or operation 410 may be omitted or skipped if the respective jobs at operations 407 and 408 is halted or otherwise fails.

At operations 411 and 412, the process 400 ends. The process 400 in one or more of the regions may end before operations 411, 412, for example, based on the status of the processing jobs performed by operations 407 and 408.

The processing of data using a processing job that may be redundantly executed across one or more regions will be described in further detail with reference to FIG. 5. Discussion of process 500 of FIG. 5 may reference FIG. 3 and the process 400 of FIG. 4. FIG. 5 is a flowchart for a executing (performing) a processing job. The process 500 includes the operations from the perspective of a server executing a received processing job. Some or all of the steps of process 500 may be performed using one or more computing devices as described herein, such as server 201 and/or server 202.

The process 500 begins as operation 501, and transitions to operation 503, where the processing job and data to be processed by the processing job is received (e.g. by servers 201 and 202 from server 210). The received processing job may include the data to be processed, or the data may be received separately. The received processing job may be provided in a job assignment, such as job assignment 304. The processing job may include a process identification, one or more validation rules, and/or machine-readable instructions for performing a process on the data 303.

The process 500 transitions to operation 505, where the processing job is executed. In this example, a sever (e.g. first server 201, second server, $n^{th}$ server 210) may execute the processing job on the received data to generate processed data. The execution of the processing job may include reading the received data, processing the data to generate processed data, and/or validating the processed data (e.g. based on validation rules included in the job assignment or otherwise separately provided to the server). The processing jobs may be an extract, transform, and load (ETL) process, but is not limited thereto. For example, the processing job may be an extraction sub-process of an ETL process; an extraction sub-process and a transform sub-process of an ETL process; or an extraction sub-process and a load sub-process of an extract, load, and transform (ELT) process.

After operation 505, the process 500 transitions to operation 507, where a status of the processing job is checked to determine if the processing job has completed. If the job has completed (YES at operation 507), which may include a status of "completed" or the like, the process 500 transitions to operation 509. If the job has not completed (NO at operation 507), which may include a status of "processing," "in progress," "active," or the like, the process 500 transitions to operation 511.

At operation 509, the local instance 310 of the status-tracking database 308 is updated to indicate that the processing job has completed. The "completed" status is then populated to the other local instances (e.g. 311) of the status-tracking database 308 to synchronize the job status across the various regions. The one or more other regions parallelly executing the job may terminate the active job or otherwise allow it to complete. After operation 509, the process 500 transitions to operation 519 where the process 500 ends. The process 500 may be repeated for the next processing job request.

At operation 511, the local instance 310 of the status-tracking database 308 is updated to indicate that the processing job has not completed. This "in progress" status is then populated to the other local instances (e.g. 311) of the status-tracking database 308 to synchronize the job status across the various regions. The synchronization of the "in progress" status can be used by the other regions and inform the other regions to continue their active processing job. If the check returns a status indicating that the job is has not completed and is in progress, it may be determined that the processing job is stalled (e.g., hung), for example, if a predetermined time threshold/limit has been exceeded.

After operation 511, the process transitions to operation 513, where the local instance 310 of the tracking status database 308 is queried to determine the status of the processing jobs in the other region(s). The query can include a request to the local instance 310 (e.g. by the Lambda function module 314) for a status report, which can then be provided by the local instance 310. In other aspects, the status from the local instance 310 can be read/pulled (e.g. by the Lambda function module 314) without submitting a request for the information.

After operation 513, the process 500 transitions to operation 515, where it is determined if the processing job has been completed by one or more other regional servers. The determination can be based on the status obtained from the local instance 310 in operation 513. If the obtained status indicates that the processing job has not been completed (NO at operation 515) by one or more other regional servers, the process 500 returns to operation 507. If the obtained status indicates that the processing job has been completed (YES operation 515) by one or more other regional servers, the process 500 transitions to operation 517.

At operation 517, the execution of the processing job by a sever (e.g. first server 201, second server, $n^{th}$ server 210) may be terminated. In one or more aspects, the processing job can be allowed to complete instead of being terminated. After operation 517, the process 500 transitions to operation 519 where the process 500 ends. The process 500 may be repeated for the next processing job request.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) Python, Perl, or any other suitable scripting language. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. Any sequence of computer-implementable instructions described in this disclosure may be considered to be an "algorithm" as those instructions are intended to solve one or more classes of problems or to perform one or more computations. While various directional arrows are shown in the figures of this disclosure, the directional arrows are not intended to be limiting to the extent that bi-directional communications are excluded. Rather, the directional arrows are to show a general flow of steps and not the unidirectional movement of information. In the entire specification, when an element is referred to as "comprising" or "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software. In addition, terms such as " . . . unit," " . . . module" described in the specification mean a unit for performing at least one function or operation, which may be implemented as hardware or software, or as a combination of hardware and software. Throughout the specification, expression "at least one of a, b, and c" may include 'a only,' 'b only,' 'c only,' 'a and b,' 'a and c,' 'b and c,' and/or 'all of a, b, and c.'

It is noted that various connections between elements are discussed in the following description. It is noted that these connections are general and, unless specified otherwise, may be direct or indirect, and that the specification is not intended to be limiting in this respect. As described herein, thresholds are referred to as being "satisfied" to generally encompass situations involving thresholds above increasing values as well as encompass situations involving thresholds below decreasing values. The term "satisfied" is used with thresholds to address when values have passed a threshold and then approaching the threshold from an opposite side as using terms such as "greater than," "greater than or equal to," "less than," and "less than or equal to" can add ambiguity where a value repeated crosses a threshold.

What is claimed is:

1. A method comprising:

receiving, by a computing device and from a first remote server, a first processing job comprising first data and one or more validation rules;

performing, by the computing device, the first processing job resulting in a processed form of the first data, wherein the performing comprises:

reading the first data;

validating, based on the one or more validation rules, the first data;

determining, by the computing device and via a local instance of a status database of the computing device, that the second remote server has not completed the first processing job;

based on the determining that the second remote server has not completed the first processing job:

writing, by the computing device, to the local instance of the status database, a status of the first processing job, wherein the status indicates that the computing device as completed the first processing job;

transmitting, by the computing device and to the second remote server, an instruction to terminate the first processing job by writing, to the local instance of a status database of the second remote server, the status; and writing, by the computing device, the processed form of the first data based on the performing the first processing job.

2. The method of claim 1, further comprising:

receiving, by the computing device from the first remote server, a second processing job comprising second data and one or more second validation rules;

performing, by the computing device, the second processing job, wherein the performing comprises:

reading the second data;

validating, based on the one or more second validation rules, at least some of the second data;

determining a failure of the performing of the second processing job by the computing device; and writing, by the computing device to the local instance of the status database of the computing device and based on the failure of the performing of the second processing job by the computing device, a second status of the second processing job, wherein the second status indicates the failure of performing the second processing job by the computing device.

3. The method of claim 1, further comprising:
receiving, by the computing device from the first remote server, a second processing job comprising a second process identification, second data, one or more second validation rules, and second machine-readable instructions to perform a second process on the second data;
performing, by the computing device, the second processing job, wherein the performing comprises:
reading the second data;
validating, based on the one or more second validation rules, at least some of the second data;
determining, by the computing device and from the local instance of the status database of the computing device, that the second remote server has completed the second processing job; and
terminating, by the computing device and based on the determining that the second remote server has completed the second processing job, the performing of the second processing job.

4. The method of claim 1, wherein the first processing job is an extraction sub process of an extraction, transform, and load process.

5. The method of claim 1, wherein determining the status of the first processing job performed by the second remote server comprises: synchronizing the local instance of the status database of the computing device and a local instance of the status database of the second remote server to determine the status of the first processing job performed by the second remote server.

6. The method of claim 1, further comprising executing, by the computing device, a lambda function configured to monitor the status of the first processing job being performed by the computing device and to write the status of the first processing job being performed by the computing device to the local instance of the status database of the computing device.

7. The method of claim 1, wherein the first data comprises data from a single data storage.

8. The method of claim 1, wherein:
the first data comprises a combination of second data from a first data storage and third data from a second data storage, and
a format of the second data corresponds to a format of the third data.

9. The method of claim 1, wherein:
the first data comprises a combination of second data from a first data storage and third data from a second data storage,
a format of the second data differs from a format of the third data.

10. An apparatus comprising:
one or more processors; and
memory storing instructions that, when executed by the one or more processors, cause the apparatus to:
receive, by a computing device and from a first remote server, a first processing job comprising first data and one or more validation rules;
perform, by the computing device, the first processing job resulting in a processed form of the first data, wherein the instructions to perform further cause the apparatus to:
execute one or more lambda functions;
read the first data; and
validate, based on the one or more validation rules, the first data;
determine, via a local instance of a status database of the computing device, that the second remote server has not completed the first processing job;
based on the determination that the second remote server has not completed the first processing job:
write, to the local instance of the status database, a status of the first processing job, wherein the status indicates that the computing device has completed the first processing job;
transmit, to the second remote server, an instruction to terminate the first processing job by writing, to the local instance of a status database of the second remote server, the status; and
write, by the computing device, the processed form of the first data based on the performance of the first processing job.

11. The apparatus of claim 10, wherein the instructions, when executed by the one or more processors, further cause the apparatus to:
receive, by the computing device from the first remote server, a second processing job comprising second data and one or more second validation rules;
perform, via the computing device, the second processing job, wherein the instructions to perform further cause the apparatus to:
read the second data; and
validate, based on the one or more second validation rules, at least some of the second data;
determine a failure of the performing of the second processing job by the computing device; and
write, by the computing device to the local instance of the status database of the computing device and based on the failure of the performing of the second processing job by the computing device, a second status of the second processing job, wherein the second status indicates the failure of performing the second processing job by the computing device.

12. The apparatus of claim 10, wherein the instructions, when executed by the one or more processors, further cause the apparatus to:
receive, by the computing device and from the first remote server, a second processing job comprising a second process identification, second data, one or more second validation rules, and second machine-readable instructions to perform a second process on the second data; and
perform, via the local computing device, the second processing job, wherein the instructions to perform further cause the apparatus to:
read the second data;
validate, based on the one or more second validation rules, at least some of the second data;
determine, by the computing device and via the local instance of the status database, whether the second remote server has completed the second processing job; and
terminate, by the computing device and based on the determining that the second remote server completed the second processing job, the performing of the second processing job.

13. The apparatus of claim 10, wherein the first processing job is an extraction sub process of an extraction, transform, and load process.

14. The apparatus of claim 13, wherein the first processing job further comprises a transform sub process of the extraction, transform, and load process.

15. The apparatus of claim 10, wherein the instructions, when executed by the one or more processors, further cause the apparatus to determine the status of the first processing job performed by the second remote server by synchronizing the local instance of the status database of the computing device and a local instance of the status database of the second remote server to determine the status of the first processing job performed by the second remote server.

16. The apparatus of claim 10, wherein the first data comprises data from a single data storage.

17. The apparatus of claim 10, wherein:
the first data comprises a combination of second data from a first data storage and third data from a second data storage, and
a format of the second data corresponds to a format of the third data.

18. The apparatus of claim 10, wherein:
the first data comprises a combination of second data from a first data storage and third data from a second data storage, and
a format of the second data differs from a format of the third data.

19. One or more non-transitory, computer-readable media storing instructions that, when executed by one or more processors, cause the one or more processors to perform steps comprising:
receiving, by a computing device and from a first remote server, a first processing job comprising a process identification, first data, one or more validation rules, and machine-readable instructions to perform a process on the first data;
performing, by the computing device, the first processing job resulting in a processed form of the first data, wherein the performing comprises:
reading the first data;
validating, based on the one or more validation rules, the first data;
determining, by the computing device and via a local instance of a status database of the computing device, that the second remote server has not completed the first processing job, wherein the local instance of the status database of the computing device is configured to replicate changes to the local instance of the status database of the computing device to a local instance of a status database of the second remote server;
based on the determining that the second remote server has not completed the first processing job:
writing, by the computing device and to the local instance of the status database, a status of the first processing job, wherein the status indicates that the computing device has completed the first processing job;
transmitting, by the computing device and to the second remote server, an instruction to terminate the first processing job by writing, to the local instance of the status database of the second remote server, the status; and
writing, by the computing device, the processed form of the first data based on the performing the first processing job.

20. The one or more non-transitory, computer-readable media of claim 19, wherein the instructions cause the one or more processors to perform further steps comprising:
receiving, by the computing device and from the first remote server, a second processing job comprising a second process identification, second data, one or more second validation rules, and second machine-readable instructions to perform a second process on the second data;
performing, via the computing device, the second processing job, wherein the performing comprises:
reading the second data; and
validating, based on the one or more second validation rules, at least some of the second data;
determining a failure of the performing of the second processing job by the computing device; and
writing, by the computing device and to the local instance of the status database of the computing device, based on the failure of the performing of the second processing job by the computing device, a second status of the second processing job, wherein the second status indicates the failure of performing the second processing job by the computing device.

* * * * *